US00RE37389B1

(19) United States
(12) Reissued Patent
Rutz et al.

(10) Patent Number: US RE37,389 E
(45) Date of Reissued Patent: Sep. 25, 2001

(54) APPLIANCE FOR IMPROVED VENTING

(75) Inventors: Allen L. Rutz, Hilliard; James H. Saunders, Worthington; Sherwood G. Talbert, Columbus, all of OH (US)

(73) Assignee: Gas Research Institute, Chicago, IL (US)

(21) Appl. No.: 09/492,666

(22) Filed: Jan. 27, 2000

Related U.S. Patent Documents

Reissue of:
(64) Patent No.: 5,941,230
Issued: Aug. 24, 1999
Appl. No.: 08/847,619
Filed: Apr. 28, 1997

(51) Int. Cl.[7] ..... F24C 1/14
(52) U.S. Cl. ..... 126/80; 126/110 R; 126/290; 126/312; 126/389.1
(58) Field of Search ..... 126/80, 85 B, 126/110 R, 116 R, 307 R, 312, 290, 389.1; 110/160, 162, 163, 147

(56) References Cited

U.S. PATENT DOCUMENTS

| | | | | |
|---|---|---|---|---|
| 4,163,441 | * | 8/1979 | Chen | 126/116 A |
| 4,289,730 | * | 9/1981 | Tomilson | 422/178 |
| 4,424,792 | * | 1/1984 | Shimek et al. | 126/80 |
| 4,515,145 | * | 5/1985 | Tallman et al. | 126/99 A |
| 4,688,547 | * | 8/1987 | Ballard et al. | 126/116 A |
| 4,951,651 | * | 8/1990 | Schllenberger | 126/116 R |
| 4,974,579 | * | 12/1990 | Shellenberger et al. | 126/110 R |
| 5,012,793 | * | 5/1991 | Guzorek | 126/85 B |
| 5,038,751 | * | 8/1991 | Riedling | 126/116 A |
| 5,056,500 | * | 10/1991 | Evens | 126/110 R |
| 5,113,844 | * | 5/1992 | Cook | 126/110 R |
| 5,174,271 | * | 12/1992 | Seo | 126/110 R |
| 5,255,665 | * | 10/1993 | Windon | 126/312 |
| 5,379,749 | * | 1/1995 | Rieke et al. | 126/110 R |

OTHER PUBLICATIONS

Lennox Industries Inc., Engineering Data, Combination Units, Rooftop, p. 63, Jan. 1986.
Lennox Industries, Inc., Engineering Data, Combination Units, Rooftop, p. 29, Jul. 1991.
New Vent Sizing Tables, A.G.A. Laboratories, 1990. pp. 1–3, 12–17.*
Accessory Masonry Chimney Venturi Kit Specifications, Inter–City Products Corporation, Aug. 1995, 1 page.*

* cited by examiner

*Primary Examiner*—James C. Yeung
(74) *Attorney, Agent, or Firm*—Pauley Petersen Kinne & Fejer

(57) ABSTRACT

A gas appliance, flue assembly, or vent adapter including an adjustable flow regulator which regulates the proportions and volume of dilution air and combustion products into the vent is disclosed. The flow regulator can be adjusted to allow a given appliance to exhaust vent gases through a range of different venting systems constructed from a wide range of materials. The appliance installer may adjust the appliance vent gases for a particular pre-existing or installed vent. The flow regulator also provides flow resistance which helps prevent backdrafting and the free escape of dilution air (which may be heated room air in some instances) through the vent to the outside atmosphere.

41 Claims, 1 Drawing Sheet

APPLIANCE FOR IMPROVED VENTING

Matter enclosed in heavy brackets [ ] appears in the original patent but forms no part of this reissue specification; matter printed in italics indicates the additions made by reissue.

This invention relates to venting systems for gas-burning appliances. More specifically, the present invention relates to a device that adjusts the dilution air flow and combustion product flow from an appliance to adapt the appliance vent gas composition for venting systems built from a variety of materials.

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Conventional gas heating appliances such as furnaces, boilers, and water heaters provide the consumer with safe, economical space and water heating, while requiring little maintenance during a long lifespan. These appliances typically use single wall galvanized vent connectors and either a masonry chimney or Type B vent pipe to vent the flue gases created during operation. The American National Standards Institute (ANSI) categorizes gas appliances based on the pressure produced in a special test vent and the difference between the actual temperature and dew point temperature of the flue gas.

A category I appliance is one which has a vent expected to operate under negative static vent pressure with a minimum of condensation. A category I furnace or boiler has an Annual Fuel Utilization Efficiency (AFUE) range of 78% minimum to approximately 83%. Moisture does not condense from the flue gas in category I appliances because the actual flue gas temperature is generally more than 140° F. above its dew point temperature. Traditional draft hood equipped appliances are category I appliances. However, many mid-efficiency, fan-assisted appliances are category I appliances as well. Such appliances can be made category I appliances by adjusting the flue gas temperature to be in the same range as the traditional category I appliance, and by designing the vent system to maintain a negative pressure even in the presence of the fan. Venting systems for category I appliances typically include Type B vents, lined masonry chimneys, and single wall metal vents.

Category II appliances also operate with negative vent pressure. However, the vent gas temperature is generally less than 140° E above its dew point temperature. The condensation occurring in these appliances requires the designer to use a corrosion resistant vent to exhaust the flue gases. There are few, if any, category II appliances on the market.

Category III appliances operate with a positive vent pressure and with a vent gas temperature generally at least 140° F, above its dew point temperature. Their AFUE ranges from approximately 78% to 83%. Because the pressure in the vent exceeds that of the surrounding atmosphere, these appliances require an airtight vent to prevent leakage of flue gases before they reach the outside venting location. An example of a category III appliance would be a mid-efficiency furnace that is vented horizontally through the wall. Venting systems for category III appliances typically include high temperature plastic and single wall stainless steel metal vents.

Category IV appliances include furnaces, boilers, and other devices that operate with a positive vent pressure and with a vent gas temperature less than 140° F above its dew point temperature. They generally have AFUE values above 83%. Because the pressure in the vent exceeds that of the surrounding atmosphere and because condensation occurs in the vent, these appliances require an airtight, corrosion-resistant vent that is equipped for condensate disposal. Category IV appliances are usually high-efficiency, condensing devices. Venting systems for category IV appliances typically include high temperature plastic, polyvinyl chloride ("PVC"), or chlorinated polyvinyl chloride ("CPVC") vents.

ANSI Z21.47-1993 provides the current category certification requirements for gas furnaces. These requirements define and use the concept of Steady State Thermal Efficiency (SSTE) in making a category determination. SSTE measures the appliance's operating efficiency by dividing the total gas energy input to the appliance into the amount of energy gainfully used by the appliance (essentially one minus the amount of energy expelled up the flue (wasted energy)) while the appliance is operating in a steady state. AFUE, on the other hand, is an overall assessment of an appliance's annual operating efficiency. ANSI Z21.47-1993 uses flue gas temperature and the flue gas carbon dioxide content to distinguish between category I and non-category I appliances based on a SSTE of 83%. The flue gas temperature of an appliance with a given SSTE varies with the amount of excess air used for combustion and the amount of dilution air added prior to the vent. These amounts, in turn, determine the percentage of carbon dioxide in the flue (7–9% for most appliances). The ANSI specification indicates, for example, that an appliance having between 7–9% carbon dioxide in the flue gas qualifies as a category I appliance when the flue gas is approximately 140° F, or more above its dew point temperature.

Assigning an appliance to a specific category is important because the category determines the type, size, material, and installation requirements of the venting system for that specific appliance. For example, a category I appliance may use traditional venting materials such as Type B vent pipe or a masonry chimney, while a category IV furnace requires a vent system built from corrosion resistant materials, and category III and IV appliances require airtight vent systems.

The flue gas of natural draft appliances, such as furnaces and water heaters, contains a large amount of water vapor. As the industry has moved to high efficiency appliances, and subsequently to lower flue gas temperatures, condensation of water and corrosive substances from the flue gas onto exhaust conduit surfaces has become a major design issue. Most new appliances are connected to an old vent, often using a single wall vent connector. In many cases, the vent is a masonry chimney. However, in today's building codes, the use of single wall metal vent connector is severely limited, and most masonry chimneys require relining before the new appliance may be installed. Converting to a Type B connector from a single will connector may cost the building owner up to 60.00, while relining a chimney to protect against condensation can cost from around 200 to 800. For another example, problems with category III appliances using high temperature plastic vents have prompted some jurisdictions and some appliance manufacturers to prohibit the use of high temperature plastics. Alternative stainless steel vent systems cost roughly twice as much as high temperature plastic systems, in the 100 to 300 range. In short, the existing vent may be completely inadequate for the new appliance and may either prevent the building owner from installing gas appliances or require the building owner to undergo an expensive and time consuming vent system replacement.

In an attempt to avoid these costs, several manufacturers have designed appliances with draft hoods that entrain dilution air into the vent. Entraining dilution air into the vent reduces the amount of condensation formed during operation and therefore reduces the number of installations which would require chimney relining. Unfortunately, this process also allows heated room air to escape in an uncontrolled fashion, both while the appliance is operating and while the appliance is idle. The escaping heat increases the heat load on the building and therefore increases the energy cost associated with controlling the building temperature. In addition, the typical draft hood equipped appliance is susceptible to backdrafting, which is especially troublesome in the multi-story housing market.

BRIEF SUMMARY OF THE INVENTION

Accordingly, one object of the present invention is to decrease the installed cost of a modern gas appliance.

Another object of the present invention is to decrease the overall energy consumption of a building.

Still another object of the present invention is to increase the installation venting options available to the gas appliance installer.

Yet another object of the present invention is to reduce backdrafting and increase the safety of the appliance vent system.

One or more of the preceding objects, or one or more other objects which will become plain upon consideration of the present specification, are satisfied in whole or in part by the invention described in this specification.

One aspect of the invention is a gas-burning appliance adapted for varying the proportions of combustion products to dilution air in its vent gas. The appliance can be a furnace, a water heater, a boiler, or some other gas appliance which is externally vented and normally used within a building or other structure.

A combustion chamber is provided for burning gas and producing combustion products. A flue gas outlet is included for passing flue gas to a mixing chamber. A dilution air inlet is used for passing dilution air into the mixing chamber. The appliance has at least one valve element defining at least a first dilution air aperture and at least a first combustion product aperture.

In one embodiment of the invention, the valve element is a flat plate and the apertures are pairs of holes in the plate. The different apertures can also be formed in other ways, as by the cooperation of two relatively movable elements (analogous to the rotating covers of some spice or parmesan cheese dispensers).

The valve element may be fixed, or the valve element may be movable between one or more positions. In the first position of a moveable valve element, the first dilution air aperture is placed between the dilution air inlet and the flue gas mixing chamber, and the first combustion product aperture is placed between the combustion chamber and the flue gas mixing chamber. The first dilution air and first combustion product aperture pair are respectively adapted to provide a first ratio of dilution air to combustion products passing into the flue gas mixing chamber when the valve element is in its first position.

In the second position of a movable valve element, the second dilution air aperture is positioned between the dilution air inlet and the flue gas mixing chamber, and the first combustion product aperture is positioned between the combustion chamber and the flue gas mixing chamber. The second dilution air and second combustion product aperture pair are respectively adapted to provide a second ratio of dilution air to combustion products passing into the flue gas mixing chamber when the movable valve element is in its second position.

The first and second ratios of dilution air to combustion products passing into the flue gas mixing chamber are different, due to the different size hole ratios or other adaptations of the dilution air aperture and combustion product aperture. This allows the combustion-products-to-dilution-air ratio to be selected to match the appliance to the venting system it will be attached to. This allows modern, high-efficiency gas appliances to be connected to traditional venting systems without causing vent corrosion, and without producing an inappropriately high or low pressure of combustion products in the vent.

In the configuration in which the valve element is fixed, the first dilution air aperture is placed between the dilution air inlet and the flue gas mixing chamber. The first combustion product aperture is placed between the combustion chamber and the flue gas mixing chamber. The valve element is secured in this position to continuously provide a first ratio of dilution air to combustion products in the flue gas mixing chamber.

Another aspect of the invention is an adapter for varying the proportions of combustion products to dilution air in the vent gas of a fuel-burning appliance. The adapter has a dilution air inlet: a combustion product inlet: a flue gas mixing chamber, and at least one fixed or movable valve element. The valve element defines at least a first dilution air aperture and at least a first combustion product aperture, and has at least a first position and hole ratio as described before. The adapter can be part of the appliance, part of the venting arrangement, or a separate, add-on installation for attachment between an appliance and a venting arrangement.

Yet another embodiment of the invention is a flue assembly adapted for varying the proportions of combustion products to dilution air passing through it The assembly comprises a dilution air inlet: a combustion product inlet: a flue gas mixing chamber, and at least one fixed or movable valve element as previously defined. Again, the assembly provides one or more ratios of dilution air to combustion products passing into the vent. This flue assembly can be installed in a building to adapt the building to receive a variety of gas appliances having different categories.

One significant advantage of the invention is its simplicity, as the flows of dilution air and combustion air can be coordinated by operating a single valve element. The valve element or adjacent structure can be marked to indicate the proper positions of the valve element for different categories of appliances (if it is installed as part of the vent system) or different vent types (if it is incorporated in the appliance), or both. This multiple-function valve element makes selection of the proper valve element position much less subject to miscalculations and errors, such as confusion about which of two separate valve elements controls the dilution air and which controls the combustion products. A fixed valve element would not require any adjustment in the field to obtain the correct ratio of dilution air to combustion products.

DETAILED DESCRIPTION OF THE INVENTION

While the invention will be described in connection with one or more preferred embodiments, it will be understood that the invention is not limited to those embodiments. On the contrary, the invention includes all alternatives, modifications, and equivalents as may be included within the spirit and scope of the appended claims.

Figure 1:
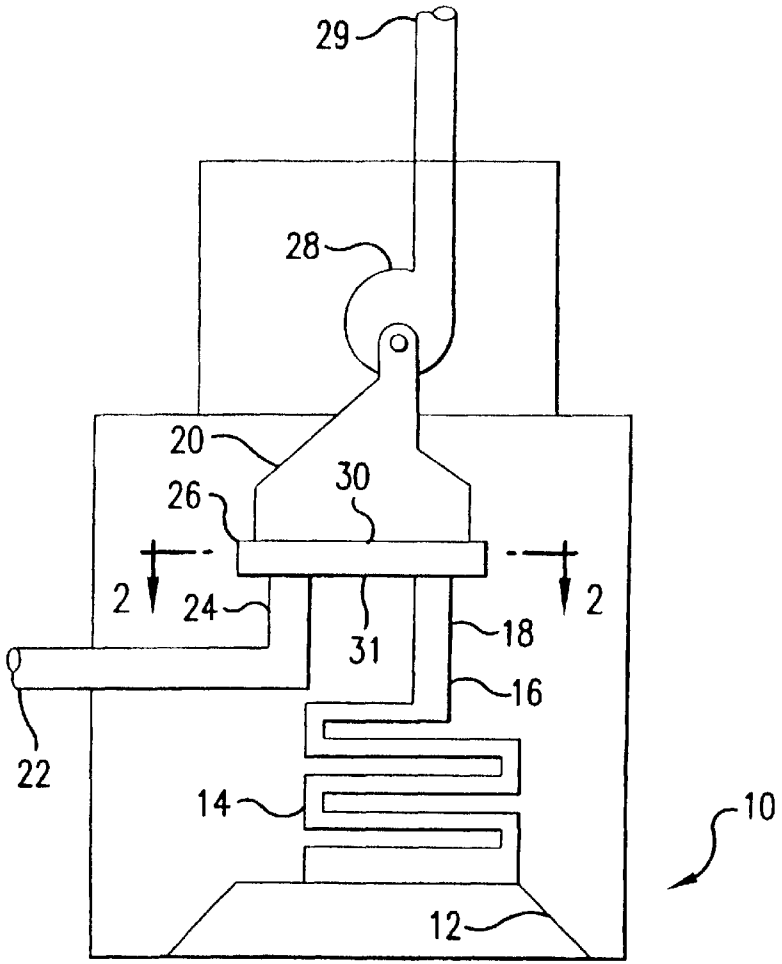
FIG. 1 is a schematic view illustrating one embodiment of the present invention.

FIG. 1 shows a gas burning appliance, for example a gas furnace, generally indicated by reference numeral 10. The appliance 10 burns natural gas, propane, or some other combustible gas in the combustion chamber 12 The resulting combustion product gases flow through the heat exchanger 14, the flue product passage 16, and the combustion flue inlet 18 into the flue gas mixing chamber 20. The combustion flue inlet 18 is shown in FIG. 1 as one end of the flue product passage 16. The appliance 10 also draws dilution air into the dilution air inlet opening 22 from outside the furnace 10, preferably from outside the building being heated. The dilution air then passes through a dilution air inlet 24, and into the mixing chamber 20. The combustion gases and dilution air both flow through the orifice plate 26, which is the valve element in this embodiment, then they mix in the flue gas mixing chamber 20 to form vent gases (combustion products mixed with dilution air). The blower 28 helps draw flue gas and dilution air through the mixing chamber 20 during on-cycles and helps exhaust the vent gases through the vent 29 to the outside atmosphere. The position of blower 28 downstream of the dilution air and combustion product inlet serves to restrict off-cycle air flows through the dilution air inlet and through the combustion flue inlet. The vent 29 may be constructed from any of the materials appropriate for a category I, II, III, or IV appliance. The blower 28 may be an integral part of the appliance, but is not so limited and may also be part of the vent system.

The orifice plate 26 includes first and second major faces and 31 perforated by pairs of dilution air apertures and combustion product apertures that may be rotated and secured the dilution air opening 24 and the combustion flue inlet 18.

Figure 2:
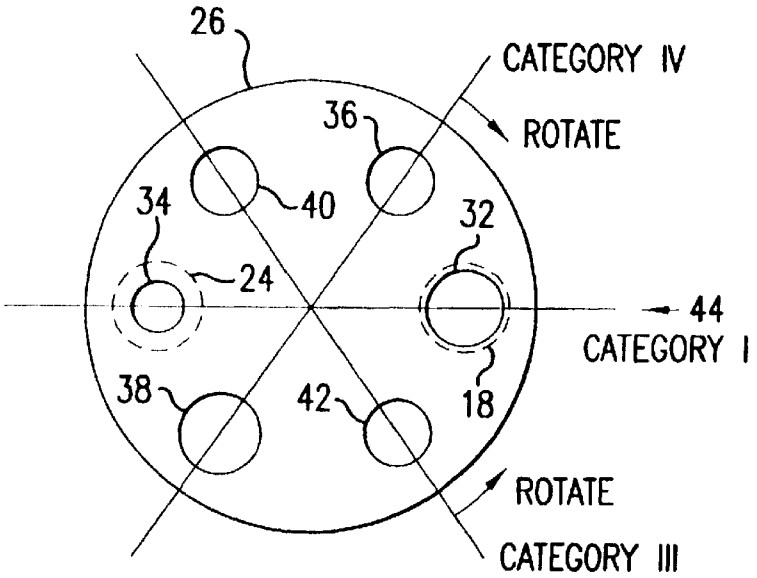
FIG. 2 shows a cross-section of a movable valve aperture plate taken along line 2—2 in FIG. 1, and having three pairs of apertures for category I, III, and IV appliances.

FIG. 2 shows an orifice plate 26 with three pairs of apertures: Category I apertures 32 and 34, and category III apertures 40 and 42, category IV apertures 36 and 38. Each "aperture" as defined here may include more than one opening within the scope of the present invention. The selected aperture 32, 36, or 42 passes combusting gas from the combustion flue inlet 18. The selected aperture 34, 38 or 40 passes dilution air from the dilution air inlet 24. The orifice plate 26 may contain as many or as few aperture pairs as the size of the manufacturer's orifice plate, the combustion flue opening, and the dilution air opening allow. The selected aperture pair 32-34. 36-38, or 40-42 controls the ratio of dilution air and combustion product gases in the flue gas mixing chamber 20 so the resulting vent gas may pass through the selected or existing vent 29 without damaging the vent 29 materials or causing undesired condensation. In FIG. 2, the aperture pair 32-34 have been selected by registering them with the dilution air inlet 24 and the combustion flue inlet 18.

Each diametrically opposed aperture pair 32-34. 36-38. 40-42 may restrict the dilution air and flue gas flows by different amounts and in different ratios to configure the appliance for a different type of vent 29 material. During installation of the appliance 10, the installer rotates the orifice plate 26 to its proper position based on the construction of the vent 29. The proper position is indicated by the category legends I, III, and IV, one of which is aligned with an external reference mark 44. The proper position places the particular pair of holes 32-34, 36-38, 40-42 which match the vent gas mixture for the construction of vent 29 over the dilution air inlet 24 and the combustion flue inlet 18.

The openings in the orifice plate 26 (and the blower 28, if present) generate flow resistance that makes the appliance 10 less susceptible to backdrafting than a typical draft hood equipped appliance. The flow resistance also restricts the flow of dilution air during the appliance 10 off-cycle, which helps to prevent heated air from escaping freely through the vent 29. Thus, less energy is required to maintain room temperature.

Each appliance 10 manufacturer may use different diameters or shapes for the dilution air inlet 24 and the combustion flue inlet 18. The orifice plate 26 itself and its hole pairs 32-34, 36-38 and 40-42 are not restricted to a round shape, but need only control the ratio of dilution air to flue gas entering the post-orifice mixing chamber region 20. The manufacturer uses Table 1 to determine the proper size for the orifice plate 26 hole pairs, 32-34. 36-38, and 40-42, that will appropriately adjust the dilution air/flue gas mixture for their desired appliance category. The orifice plate 26 is preferably constructed from a non-corrosive stainless steel.

Natural gas produces about 1,000 Btus of heat energy per cubic foot of gas burned. About 14 cubic feet of air are needed per cubic foot of natural gas for acceptable combustion and a gas appliance with no dilution air needs to exhaust about 15 cubic feet of combustion products per 1.000 Btu. A gas furnace that operates at 100,000 Btus per hour needs to exhaust about 1,500 cubic feet of combustion products per hour or about 22 standard cubic feet per minute (scfm). Dilution air, as used in Table 1, is measured as a percentage of flue products. A table value of 100 percent dilution air, for example, means approximately 15 cubic feet of dilution air per 1000 Btu of gas burned, for a total of 30 cubic feet of vent gases per 1,000 Btu. In other words, a hole pair in the orifice plate 26 must be sized to allow equal amounts of dilution air and combustion gas to mix in the flue gas mixing chamber 20. A gas furnace that operates at 100,000 Btu per hour, which needs 100 percent dilution air, needs to exhaust approximately 44 scfm of vent gases. As shown in Table 1, the percentage of dilution air required differs depending on whether the appliance uses outdoor (42° F.) dilution air, or indoor (60° F.) dilution air.

As an example, assume that a manufacturer anticipates that its indoor dilution air. SSTE 81 appliance will be installed in locations that may have one of three venting systems: PVC, CPVC, or high-temperature plastic. In this situation, rather than design and manufacturing three separate appliances that meet the vent gas requirements for each possible venting system, the manufacturer may design and manufacture one appliance with an orifice plate 26 having three aperture pairs 32 and 34-36 and 38, and 42. Table 1 indicates, for example, that the orifice plate 26 should include a hole pair 36 and 38 that mixes approximately 300% dilution air to combustion products for a PVC system, a hole pair 32 and 34 that mixes approximately 110% dilution air to combustion products for a CPVC system, and a hole pair 40 and 42 that mixes approximately 150% dilution air to combustion products for a high-temperature plastic vent system. The suggested mixing percentages in Table 1 are targeted at meeting the flue gas criteria (also shown in Table 1). For example, keeping the flue gas temperature under 140° F, in a PVC vent system. Furthermore, the installer need not know beforehand which venting system the installation site uses, because the installer can rotate the orifice plate 26 during installation to adjust the flue gas output of the appliance 10 for the venting system used in the building.

The orifice plate 26 is not limited to any particular number of apertures or sets of apertures, nor to any particular aperture shape or number of apertures. The manufacturer, for example, may choose to use a large plate with enough area for many aperture pairs, or a small plate with enough area for fewer aperture pairs. The apertures need only be sized and positioned correctly to adjust the mixture of combustion product gases and dilution air according to Table 1. The SSTE ranges and the flue gas criteria shown in Table 1are not all inclusive. The invention may be used with additional SSTE ratings or additional criteria not indicated in the table simply by determining the criteria of interest and adjusting the orifice plate 26 aperture pairs such as 32-34, 36-38 or 40-42 to meet those criteria.

TABLE 1

Approximate Vent Ditution Air Requiremsnts for Gas Appliances

| Venting System: | Plastic PVC Vent System | Plastic CPVC Vent System | High Temperature Plastic Vent System |
|---|---|---|---|
| Flue gas Criteria: | Flue Gas Temperature Less Than 140° F. | Flue Gas Temperature Less Than 210° F. | Vent Dries Completety |
| Outdoor (42° F.) Dilution Air | | | |
| SSTE 80 | 350% | 130% | 200% |
| SSTE 81 | 300% | 110% | — |
| SSTE 82 | 250% | 80% | — |
| SSTE 83 | 200% | 60% | — |
| Indoor (60° F.) Dilution Air | | | |
| SSTE 80 | 350% | 130% | 100% |
| SSTE 81 | 300% | 110% | 150% |
| SSTE 82 | 250% | 80% | 300% |
| SSTE 83 | 200% | 60% | — |
| SSTE 85 | 100% | 10% | — |
| SSTE 87 | 30% | 0% | — |

Approximate Vent Dilution Air Requirements for Gas Appliance

| Venting System: | High Temperature Plastic Vent System | Type B Vent System | Interior Masonry Chimney | Exterior Masonry Chimney |
|---|---|---|---|---|
| Flue gas Criteria: | All Interior Portions of the Vent Dry by the End of the Burner On-cycle | Maintain Negative Pressure: Avoid Excessive Conden-sation | Maintain Negative Pressure: Avoid Excessive Conden-sation | Maintain Negative Pressure: Avoid Excessive Conden-sation |
| Outdoor (42° F.) Dilution Air | | | | |
| SSTE 80 | 100% | 0% | — | — |
| SSTE 81 | 200% | 0% | — | — |
| SSTE 82 | — | 0% | — | — |
| SSTE 83 | — | 0% | — | — |
| Indoor (60° F.) Dilution Air | | | | |
| SSTE 80 | 50% | 0% | 50% | — |
| SSTE 81 | 100% | 0% | — | — |
| SSTE 82 | 150% | 0% | — | — |
| SSTE 83 | 200% | 0% | — | — |

TABLE 1-continued

| | | | | |
|---|---|---|---|---|
| SSTE 85 | — | — | — | — |
| SSTE 87 | — | — | — | — |

*Dilution air required to cool flue gases to a safe temperature is determined by the requirements for the warmest expected day (60° F.); condensation is based on a typical day (42° F.).

We claim:

1. A gas-burning appliance adapted for varying the proportions of combustion products to dilution air in its vent gas, said appliance comprising:

A. a combustion chamber for burning gas and producing combustion products:

B. a combustion flue inlet for passing flue gas from said combustion chamber to a mixing chamber:

C. a dilution air inlet for passing dilution air into said lo mixing chamber:

D. at least one valve element defining at least first and second dilution air apertures and at least first and second combustion product apertures, said at least one valve element being movable between:

i. a first position causing said first dilution air aperture to regulate the flow of dilution air through said dilution air inlet and causing said first combustion product aperture to regulate the flow of combustion products through said combustion flue inlet: and ii. a second position causing said second dilution air aperture to regulate the flow of dilution air through said dilution air inlet and causing said second combustion product aperture to regulate the flow of combustion products through said combustion flue inlet:

wherein said first dilution air and first combustion product apertures are respectively adapted to provide a first ratio of dilution air to combustion products passing into said mixing chamber and said second dilution air and second combustion product apertures are respectively adapted to provide a second ratio of dilution air to combustion products passing into said mixing chamber, wherein said first and second ratios are different.

2. The gas-burning appliance of claim 1, wherein said at least one valve element further defines at least a third dilution air aperture and at least a third combustion product aperture, said valve element has a third position causing said third dilution air aperture to regulate the flow of dilution air through said dilution air inlet and causing said third combustion product aperture to regulate the flow of combustion products through said combustion flue inlet, and said third dilution air and third combustion product apertures are respectively adapted to provide a third ratio of dilution air to combustion products passing into said mixing chambers, wherein said first, second, and third ratios are different.

3. The gas-burning appliance of claim 1, wherein said at least one valve element has first and second major faces, and said apertures are perforations extending through said first and second major faces.

4. The gas-burning appliance of claim 3, wherein said at least one valve element is a plate having said major faces disposed substantially parallel to each other on opposite sides of said plate.

5. The gas-burning appliance of claim 4, wherein said plate is rotatable substantially in a plane substantially parallel to said major faces between at least said first and second positions.

6. The gas-burning appliance of claim 3, further comprising a combustion product passage for passing combustion products from said combustion chamber into said mixing chamber and a dilution air passage for passing dilution air from said dilution air inlet into said mixing chamber, wherein said dilution air passage and said combustion product passage are adjacent to said first major face, and said mixing chamber is adjacent to said second major face.

7. The gas-burning appliance of claim 6, further comprising a blower located downstream of said combustion flue inlet and said dilution air inlet for drawing flue gas and dilution air through said mixing chamber.

8. The gas-burning appliance of claim 1, configured as a furnace.

9. The gas-burning appliance of claim 8, further comprising a blower located downstream of said combustion flue inlet and said dilution air inlet for drawing flue gas and dilution air through said mixing chamber.

10. The gas-burning appliance of claim 1, configured as a water heater.

11. The gas-burning appliance of claim 10, further comprising a blower located downstream of said combustion flue inlet and said dilution air inlet for drawing flue gas and dilution air through said mixing chamber.

12. The gas-burning appliance of claim 1, configured as a boiler.

13. The gas-burning appliance of claim 12, further comprising a blower located downstream of said combustion flue inlet and said dilution air inlet for drawing flue gas and dilution air through said mixing chamber.

14. The gas-burning appliance of claim 1, further comprising a blower located downstream of said combustion flue inlet and said dilution air inlet for drawing flue gas and dilution air through said mixing chamber.

15. An adapter for varying the proportions of combustion products to dilution air in the vent gas of a fuel-burning appliance, said adapter comprising:

A. a dilution air inlet:

B. a combustion flue inlet:

C. a mixing chamber; and

D. at least one valve element defining at least first and second dilution air apertures and at least first and second combustion product apertures, said at least one valve element being movable between:

i. a first position causing said first dilution air aperture to regulate the flow of dilution air through said dilution air inlet and causing said first combustion product aperture to regulate the flow of combustion products through said combustion flue inlet: and ii. a second position causing said second dilution air aperture to regulate the flow of dilution air through said dilution air inlet and causing said second combustion product aperture to regulate the flow of combustion products through said combustion flue inlet:

wherein said first dilution air and first combustion product apertures are respectively adapted to provide a first ratio of dilution air to combustion products passing into said mixing chamber, and said second dilution air and second combustion product apertures are respectively sized to provide a second ratio of dilution air to combustion products passing into said mixing chamber, wherein said first and second ratios are different.

16. The adapter of claim 15, wherein said at least one valve element further defines at least a third dilution air aperture and at least a third combustion product aperture, wherein said third dilution air and third combustion product apertures are respectively adapted to provide a third ratio of dilution air to combustion products passing into said mixing chambers, wherein said first, second, and third ratios are different.

17. The adapter of claim 15, wherein said at least one valve element has first and second major faces, and said apertures are perforations communicating through said first and second major faces.

18. The adapter of claim 17, wherein said at least one valve element is a plate having said major faces disposed substantially parallel to each other on opposite sides of said plate.

19. The adapter of claim 18, wherein said plate is rotatable substantially in a plane substantially parallel to said major faces between said first and second positions.

20. The adapter of claim 19, wherein said dilution air inlet and said combustion product inlet are adjacent to said first major face, and said mixing chamber is adjacent to said second major face.

21. A flue assembly adapted for varying the proportions of combustion products to dilution air passing through it, said assembly comprising:

A. a dilution air inlet:

B. a combustion flue inlet;

C. a vent: and

D. at least one valve element defining at least first and second dilution air apertures and at least first and second combustion product apertures, said at least one valve element being movable between:

i. a first position causing said first dilution air aperture to regulate the flow of dilution air through said dilution air inlet and causing said first combustion product aperture to regulate the flow of combustion products through said combustion flue inlet: and ii. a second position causing said second dilution air aperture to regulate the flow of dilution air through said dilution air inlet and causing said first combustion product aperture to regulate the flow of combustion products through said combustion flue inlet:

wherein said first dilution air and first combustion product apertures are respectively adapted to provide a first ratio of dilution air to combustion products passing into said vent and said second dilution air and second combustion product apertures are respectively sized to provide a second ratio of dilution air to combustion products passing into said vent, wherein said first and second ratios are different.

22. The flue assembly of claim 21, wherein said at least one valve element further defines at least a third dilution air aperture and at least a third combustion product aperture, wherein said third dilution air and third combustion product apertures are respectively adapted to provide a third ratio of dilution air to combustion products passing into said vent, wherein said first, second, and third ratios are different.

23. The flue assembly of claim 21, wherein said at least one valve element has first and second major faces, and said apertures are perforations communicating through said first and second major faces.

24. The flue assembly of claim 23, wherein said at least one valve element is a plate having said major faces disposed substantially parallel to each other on opposite sides of said plate.

25. The flue assembly of claim 24, wherein said plate is rotatable substantially in a plane substantially parallel to said major faces between said first and second positions.

26. The flue assembly of claim 23, wherein said dilution air inlet and said combustion product inlet are adjacent to said first major face, and said flue is adjacent to said second major face.

27. A gas burning appliance *disposed within a building* adapted for controlling the proportion of combustion products to dilution air in its vent gas, said appliance comprising:

A. a combustion chamber for burning gas and producing combustion products;

B. a combustion flue inlet for passing flue gas from said combustion chamber to a mixing chamber;

C. a dilution air inlet for passing dilution air into said mixing chamber;

D. at least first and second flow restrictors, said first flow restrictor secured in a position regulating the flow of dilution air through said dilution air inlet and said second flow restrictor secured in a position regulating the flow of combustion products through said combustion flue inlet; wherein said first and second flow restrictors are defined by at least one valve element having first and second major faces and perforations extending through said first and second major faces, and wherein said first and second flow restrictors are respectively adapted to provide a ratio of dilution air to combustion products passing into said mixing chamber; and

*E. a low-temperature vent in fluid communication with said mixing chamber and providing a conduit for combustion products out of the building.*

28. The gas-burning appliance of claim 27, wherein said at least one valve element is a plate having said major faces disposed substantially parallel to each other on opposite sides of said plate.

29. The gas-burning appliance of claim 27, further comprising a combustion product passage for passing combustion products from said combustion chamber into said mixing chamber and a dilution air passage for passing dilution air from said dilution air inlet into said mixing chamber, wherein said dilution air passage and said combustion product passage are adjacent to said first major face, and said mixing chamber is adjacent to said second major face.

30. The gas-burning appliance of claim 29, further comprising a blower located downstream of said combustion flue inlet and said dilution air inlet for drawing flue gas and dilution air through said mixing chamber.

31. The gas-burning appliance of claim 27, configured as a furnace.

32. The gas-burning appliance of claim 31, further comprising a blower located downstream of said combustion flue inlet and said dilution air inlet for drawing flue gas and dilution air through said mixing chamber.

33. The gas-burning appliance of claim 27, configured as a water heater.

34. The gas-burning appliance of claim 33, further comprising a blower located downstream of said combustion flue inlet and said dilution air inlet for drawing flue gas and dilution air through said mixing chamber.

35. The gas-burning appliance of claim 27, configured as a boiler.

36. The gas-burning appliance of claim 35, further comprising a blower located downstream of said combustion flue inlet and said dilution air inlet for drawing flue gas and dilution air through said mixing chamber.

37. The gas-burning appliance of claim 27, further comprising a blower located downstream of said combustion flue inlet and said dilution air inlet for drawing flue gas and dilution air through said mixing chamber.

*38. The gas burning appliance of claim 27 wherein said low-temperature vent is designed to hold pressure that exceeds atmospheric pressure.*

*39. The gas burning appliance of claim 27 wherein the low-temperature vent comprises one of a high temperature plastic, polyvinyl chloride, and chlorinated polyvinyl chloride.*

*40. The gas burning appliance of claim 27 wherein a blower is positioned within said low-temperature vent.*

*41. The gas burning appliance of claim 27 wherein a blower is positioned between said low-temperature vent and said mixing chamber.*

* * * * *